J. H. HALL.
CONTROL SYSTEM FOR ELECTRIC MOTORS.
APPLICATION FILED DEC. 16, 1912.
1,062,708.
Patented May 27, 1913.
2 SHEETS—SHEET 1.
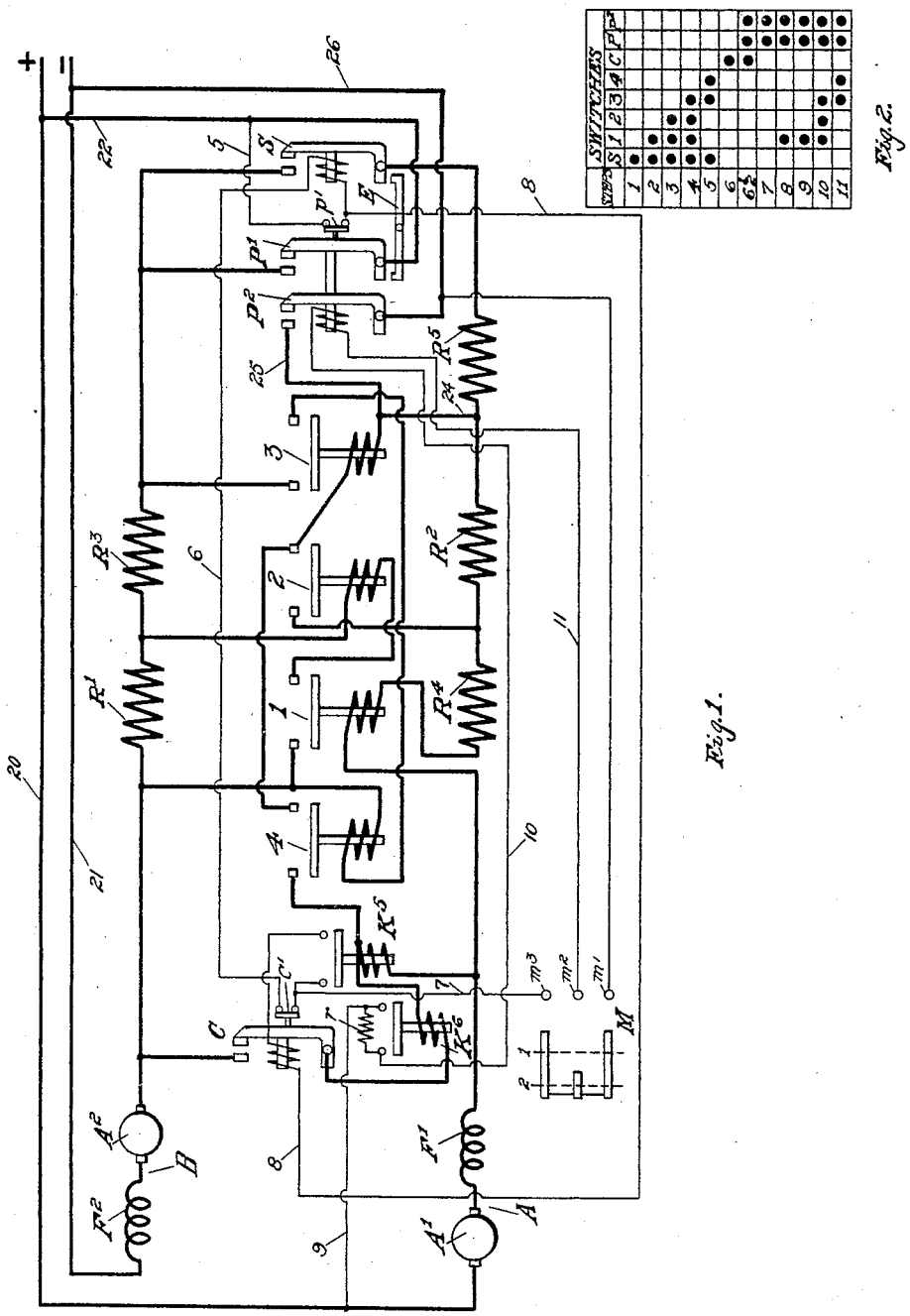
WITNESSES:
Elva Staniels
Alice E. Duff
INVENTOR.
Jay H. Hall
BY
F. N. Barber
ATTORNEY.

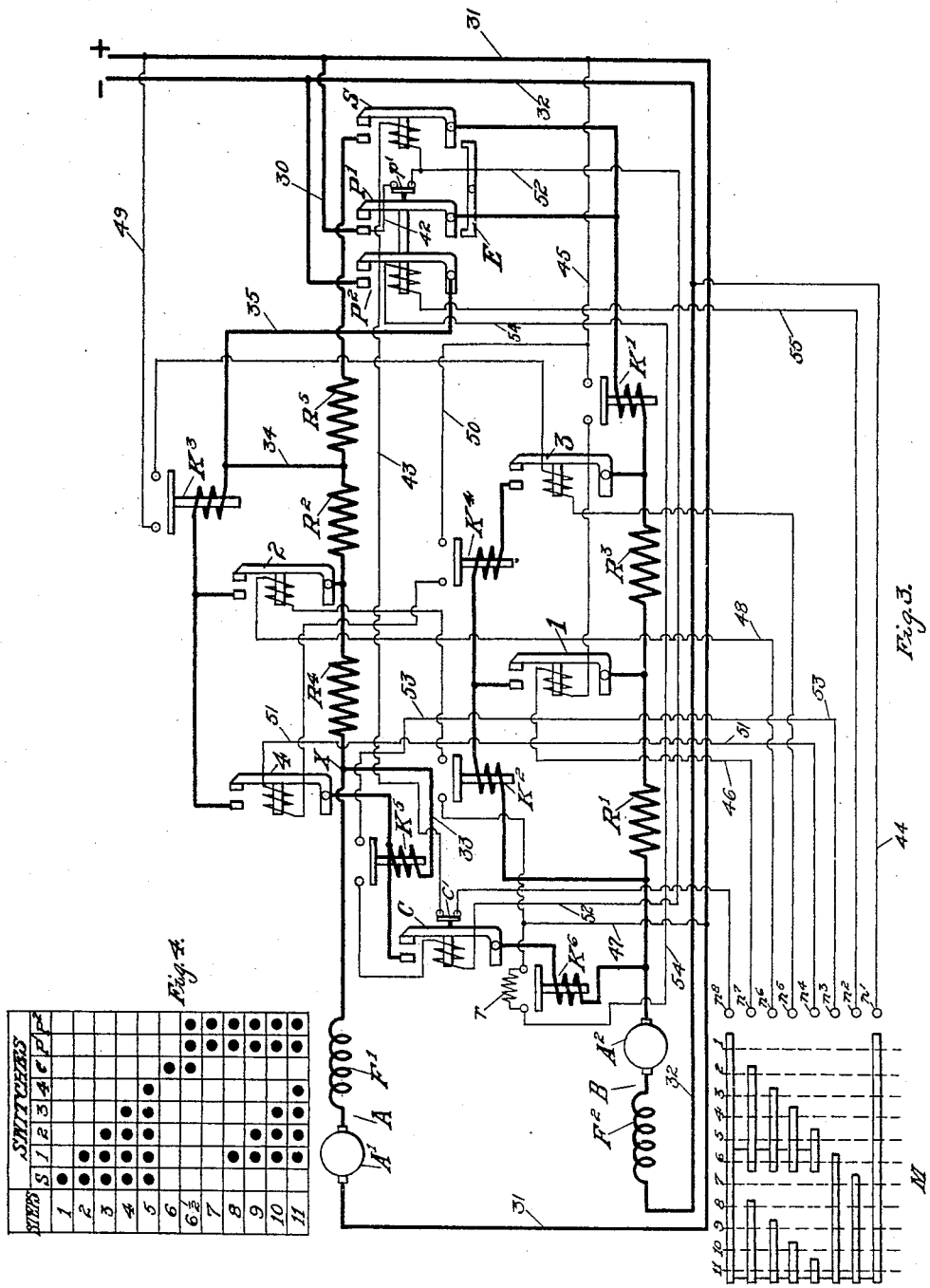

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

CONTROL SYSTEM FOR ELECTRIC MOTORS.

1,062,708.      Specification of Letters Patent.      Patented May 27, 1913.

Application filed December 16, 1912. Serial No. 736,904.

*To all whom it may concern:*

Be it known that I, JAY H. HALL, a citizen of the United States, residing at Cleveland, in the county of Cuyahoga and State of Ohio, have invented new and useful Improvements in Control Systems for Electric Motors, of which the following is a specification.

My invention relates to the control of electric motors, and more particularly to the control of two or more motors in a series-parallel system, in which magnetically-operated switches are used for controlling the motor circuits. In some cases I prefer to operate the switches by the current in the motor circuit.

One of the objects of my invention is to provide a system in which a larger number of speed points is secured with a given number of switches than has been obtained heretofore.

Another object of my invention is to eliminate, so far as possible, the large number of control-circuit contacts that have been necessary in previous controllers using magnetically-operated switches, and at the same time to secure all the advantages of this type of control including electrical interlocks.

Other objects will appear from the following description.

Referring to the drawings, Figure 1 is a diagrammatic representation of a system of control embodying one of the many forms which my invention may assume. Fig. 2 is a key to the various circuit connections shown in Fig. 1. Fig. 3 is a diagram of another form of my invention, and Fig. 4 is a key to the circuit connections shown in Fig. 3.

Referring to Fig. 1, one motor, A, to be controlled is shown with the armature A' and series field F', the other motor, B, being shown with armature $A^2$ and series field $F^2$. Resistances R', $R^2$, $R^3$, $R^4$, and $R^5$ are arranged to be connected in the motor circuits for varying the speed of the motors. The switch S is for connecting the two motors in series with each other and with all of the starting resistance. The sections of resistance are arranged to be cut out in succession by the resistance-controlling switches 1, 2, 3, and 4. The switch C is for cutting out the resistance $R^5$, and for connecting the motors directly to the source of supply in series with each other. The switches P', $P^2$, operated by the same winding, are for connecting the motors to the source of supply in parallel with each other, the resistances R' and $R^3$ being in one motor circuit and the resistances $R^2$ and $R^4$ being in the other motor circuit. These resistances can be cut out in succession by the closure of the resistance controlling switches 1, 2, 3, and 4. The magnetically-operated switches S, C, P', $P^2$ are controlled from a master controller M. The switch C is also controlled by a relay $K^5$, which must close its contacts before the switch C can close. The switches P', $P^2$ are also controlled by the relay $K^6$, arranged to short circuit the resistance $r$ in the circuit of the winding of the switches P', $P^2$, which cannot close until the relay $K^6$ closes its contacts. The switches S and C have their windings supplied with current through the contacts $p'$ on the switches P', $P^2$, the contacts $p'$ being closed when these switches are in their open position. The winding of the switch S has its current supplied through the contacts $c'$ on the switch C, which are closed when the switch C is in its open position.

The windings of the resistance controlling switches 1, 2, 3, and 4 and of the relays $K^5$ and $K^6$ are arranged to be connected in the motor circuit for operation of these switches. The resistance controlling switches and the relays are of the type of switch shown in Canfield's application, Serial Number 583,000, and Eastwood's Patent, No. 1,040,292, which have the peculiar characteristic of being locked in their initial or open position when the current in their windings is above a predetermined value, and of being operated to close their contacts when the current in their windings is reduced.

In addition to the electrical interlocks between the switches S and P', $P^2$, I provide the mechanical interlock E, which comprises a centrally pivoted lever which prevents the simultaneous closure of the switch S and the switches P', $P^2$.

The operation of the control system shown on Fig. 1 is as follows: Upon movement of the master controller to position 1, a control circuit is established for the switch S, which passes from the positive side of the source through the conductor 5, the contacts $p'$, the winding of the switch S, the conductor 6, the contacts $c'$, the conductor 7, and the contacts $m^3$, $m'$ on the master controller to the negative side of the source. The current through the winding of the switch S closes the same, thereby completing the motor circuit as follows: From the positive side of the source, through the conductor 20, the armature A′ and the field F′ of one motor, the winding of the switch 1, the resistances $R^4$, $R^2$, and $R^5$, the switch S, the resistances $R^3$, R′, and the armature $A^2$ and the field $F^2$ of the other motor to the negative side of the source through the conductor 21. This circuit connects the motors in series with each other and with all of the starting resistance, causing them to run at their slowest speed. The current which initially flows through the winding of the switch 1 is sufficient to lock the switch open, but when the motors increase their speed, thereby reducing the current in the motor circuit and in the winding of the switch 1, this switch closes its contacts, short-circuiting the resistance R′ and connecting in circuit the winding of the switch 2. The increased current in the motor circuit due to the cutting out of the resistance R′ locks the switch 2 in its open position, but when the motors have increased their speed sufficiently to lower the current to the point at which the switch 2 is adjusted to operate, its contacts will close, thereby short-circuiting the resistance $R^2$ and connecting in circuit the winding of the switch 3. The current in the motor circuit is again increased, which may lock the switch 3 to its open position, but when the current is reduced due to the speeding up of the motors, the contacts of the switch 3 will close and short-circuit the resistance $R^3$ and connect in circuit the winding of the switch 4. Switch 4 is first locked open, by reason of the increased current in the motor circuit, but its contacts are closed when the current in the motor circuit decreases to the value at which the switch 4 is adjusted to operate. The switch 4 in closing short-circuits the resistance $R^4$ and also the windings of the switches 1 and 2, causing these switches to open their contacts; and in addition the switch 4 connects into the motor circuit the winding of the relay $K^5$. The motor circuit is now as follows: From the positive main through the conductor 20, the armature A′, the field winding F′, the winding of the relay $K^5$, the contacts of the switch 4, the winding of the switch 3, the resistance $R^5$, the contacts of the switch S, the contacts of the switch 3, the winding of the switch 4, the armature $A^2$, the field winding $F^2$, and the conductor 21 to the negative main. The relay $K^5$ first locks its contacts open by reason of the increased current in the motor circuit; but when the current is reduced by reason of the speeding up of the motors, the relay $K^5$ closes its contacts and includes the winding of the switch C in the following circuit: from the positive main through the conductor 5, the contacts $p'$, the conductor 8, the winding of the switch C, the contacts of the relay $K^5$, the conductor 7, and the contacts $m^3$ and $m'$ of the master controller to the negative main. The current in this circuit closes the switch C, which short-circuits the resistance $R^5$, as well as the contacts and windings of the switches 3 and 4, causing these switches to open, and connects into the motor circuit the winding of the relay $K^6$. The closure of the switch C connects the two motors directly across the line in series with each other. When the switch C closes, it opens its contacts $c'$, thereby deënergizing the winding of the switch S, and causing the switch S to open. The motor circuit is then as follows: from the positive main through the conductor 20, the armature A′, the field winding F′, the winding of the relay $K^5$, the winding of the relay $K^6$, the contacts of the switch C, the armature $A^2$, and the field winding $F^2$, to the negative. The motors, being connected in series, will run at approximately half speed.

To further increase the speed of the motors, they may be connected in parallel, with resistance in series with the motors. To connect the motors in parallel, the operator moves the master controller to the position 2, thereby establishing the following circuit: from the positive main through the conductor 9, the resistance $r$, the conductor 10, the winding of the switches P′, $P^2$, the conductor 11, and the contacts $m^2$, $m'$ of the master controller to the negative main. The current in the winding of the switches P′, $P^2$, being limited by the resistance $r$, is not sufficient to close the same. After the motors have been connected in series, however, at the contacts of the switch C, the relay $K^6$ is first locked to its open position by the increased current in the motor circuit; but when the current is reduced by reason of the speeding up of the motors, the relay $K^6$ closes its contacts and short-circuits the resistance $r$, so that the switches P′, $P^2$ may close their contacts in the motor circuit, and open the contacts $p'$, causing the deënergization of the winding of the switch C, which thereupon opens. The armature A′ and the field winding F′ are then connected to the source of supply in series with the resistances $R^2$ and $R^4$, and the armature $A^2$ and the field winding $F^2$ are connected to the source of supply in series with the resistances R′ and $R^3$. These motor circuits are as follows: from the positive main through the conductor 22, the switch P′, the resistances $R^3$ and R′, the armature $A^2$, and the field winding $F^2$ to the negative. Current also flows from the positive main through the conductor 20, the armature A′, the field winding F′, the winding of the switch 1, the resistances R⁴ and R², the conductors 24 and 25, the switch P², and the conductor 26 to the negative main. The current through the winding of the switch 1 first locks the switch open and then causes it to close its contacts when the current is reduced, thereby short-circuiting the resistance R' and connecting the winding of the switch 2 in the circuit of the motor B. This switch first locks its contacts open as before, and upon the proper reduction of current closes its contacts, short-circuits the resistance R² in the circuit of the motor A, and connects the winding of the switch 3 in the circuit of this motor. The switch 3 is closed at the proper value of the current in this motor, short-circuits the resistance R³ in the circuit of the motor B, and connects the winding of the switch 4 in the circuit of the motor B. In a similar manner, the switch 4 closes its contacts after the proper reduction of current in its winding, and short-circuits the resistance R⁴ and the windings and the contacts of the switches 1 and 2. The switches 1 and 2 open their contacts in the motor circuit, and the two motors are connected in parallel across the line through the following circuits: from the positive main through the conductor 22, the switch P', the contacts of the switch 3, the winding of the switch 4, and the motor B to the negative main; and also from the positive main through the conductor 20, the motor A, the winding of the relay K⁵, the contacts of the switch 4, the winding of the switch 3, the conductor 25, the contacts of the switch P², and the conductor 26 to the negative main. The relay K⁵ will close its contacts; but as the winding C has its circuit opened at the contacts $p'$ on the switches P', P², the switch C will remain open. The motors being connected in parallel to the source of supply, without any resistance in circuit, operate at their normal full speed. The switches 3 and 4 remain closed, since their windings are both energized. The operator can cause the motors to reduce their speed by moving the controller back to position 1, whereupon the switches P', P², will open, since their winding is deënergized, and the switch C will close, connecting the motors in series to the source of supply, thus causing the motors to operate at approximately half speed. To stop the motors, the operator moves his master controller to the off position, which is the position shown, causing the switch C to open and disconnect the motors from the source of supply.

Fig. 2 indicates which of the switches are closed at the various steps in the acceleration of the motor; for instance, step 6 is the full series position, with all the resistance cut out, at which time the switch C only is closed; step 11 is the full parallel position, with all the resistance cut out, at which time the switches 3, 4, P' and P² are closed.

Fig. 3 shows a system which is practically the same as Fig. 1, with the exception that the resistance controlling switches are supplied with shunt windings controlled from contacts on the master controller, so that the operator can delay the acceleration of the motors at will, thereby securing a greater number of speeds.

In the system shown in Fig. 1, the operator can maintain the speed of the motors only at half speed and full speed, the intermediate steps taking place automatically as rapidly as the variations of current in their motor circuit will permit the switches to close and cut out the starting resistance.

In the system shown in Fig. 3, the operator can stop the progression of the switches on any step he desires, and cause the motors to continue running at the corresponding speed. Each step of the acceleration now becomes a speed point, and the operator can therefore have positive control of eleven distinct speed positions of the controller. In Fig. 3 the switch S connects the motors in series, and the switches P', P² connect them in parallel, as in Fig. 1. The switch C connects the motors directly in series across the line, short-circuiting all of the starting resistances and the switches controlling them. These controlling switches 1, 2, 3, and 4 are controlled from the master switch, but each one has associated with it a relay which controls its closure in accordance with the current flowing in the motor circuit. These relays K', K², K³, and K⁴, have their windings arranged to be connected in the motor circuit, and together with relays K⁵ and K⁶ are of the type of relay shown in Eastwood's said Patent, No. 1,040,292. The relay K⁵ controls the closure of the switch C as in Fig. 1, and the relay K⁶ controls the closure of the parallel switches P', P², as in Fig. 1.

I will describe the operation of the controller, assuming that the operator moves the master switch first to the position 6, which is the full series position, and then to the position 11, which is the full multiple position, it being understood that he can stop at any one of the positions from 1 to 11, and prevent the closure of the respective resistance controlling switches 1, 2, 3, and 4 on the steps 2, 3, 4, and 5, and the steps 7, 8, 9, and 10. Assuming that the master switch has been moved to the position 6, the switch S first closes, since its winding is energized by the circuit which goes from the positive side of the source of supply through the conductor 30, the conductor 42, the contacts $p'$, the winding of the switch S, the conductor 43, the contacts $c'$ on the switch C, the master controller contacts $n^8$ and $n'$, and the conductor 44 to the negative side of the source. The motor current now flows from the positive main through the conductor 31, the motor A, the resistance R⁴, R², and R⁵, the switch S, the winding of the relay K', the resistances R³ and R', the motor B, and the conductor 32 to the negative main. The motors, being connected in series across the line with all the starting resistance in circuit, begin to operate at their slowest speed. The first rush of current causes the relay K' to lock its contacts open, but when the current is reduced to the value at which this relay is adjusted to operate, it closes its contacts in the circuit of the winding of the switch 1 through the following circuit: from the positive conductor 31, through the conductor 45, the contacts of the relay K', the winding of the switch 1, the conductor 46, and the contacts $n^7$ and $n'$ of the master controller to the negative conductor 32. The switch 1 now closes its contacts, short-circuits the resistance R', and connects the winding of the relay K² in the motor circuit. This relay first locks open its contacts, and upon the proper reduction of the current in the motor circuit, closes its contacts in the circuit of the winding of the switch 2 as follows: from the positive conductor 31 through the conductor 47, the contacts of the relay K², the winding of the switch 2, the conductor 48, and the contacts $n^6$ and $n'$ on the master controller to the negative conductor 32. The switch 2 now closes its contacts, short-circuits the resistance R², and connects in the motor circuit the winding of the relay K³. This relay first locks open its contacts, and then closes them when the motor current is reduced, closing the circuit of the winding of the switch 3 through the circuit from the positive conductor 31 through the conductor 49, the contacts of the relay K³, the winding of the switch 3, and the contacts $n^5$ and $n'$ on the master controller to the negative conductor 32. The switch 3 now closes its contacts, short-circuits the resistance R³, and connects into the motor circuit the winding of the relay K⁴. This relay first locks open its contacts and then operates to close them, connecting the winding of the switch 4 in a circuit from the positive conductor 31 through the conductors 45 and 50, the contacts of the relay K⁴, the winding of the switch 4, the conductor 51, and the contacts $n^4$ and $n'$ to the negative conductor 32. The switch 4 now closes its contacts, short circuits the resistance R⁴, and connects in the motor circuit the winding of the relay K⁵. This relay first locks open its contacts and then closes them upon proper reduction of current in the motor circuit. Upon closure of its contacts it energizes the winding of the switch C through the following circuit: from the positive conductor 31 through the conductors 30 and 42, the contacts $p'$, the conductor 52, the winding of the switch C, the contacts of the relay K⁵, the conductor 53, and the contacts $n^3$ and $n'$ on the master controller to the negative conductor 32. The switch C now closes its contacts in the motor circuit, and opens the contacts $c'$, causing the switch S to open. The windings of the relays K', K², K³, and K⁴ are thereby deenergized whereupon the switches 1, 2, 3, and 4 open their contacts. The motor circuit is now as follows: from the positive conductor 31 through the motor A to the point X, thence through the conductor 33, the winding of the relay K⁵, the contacts of the switch C, the winding of the relay K⁶, the motor B, and the conductor 32 to the negative.

The motors now run at approximately half speed, and will continue to do so as long as the master controller is held in position 6. On moving the master controller to position 11, the contacts $n^2$, $n^7$, $n^6$, $n^5$, and $n^4$ on the master controller are successively energized. A small amount of current flows in the winding of the switches P', P², but it is limited by the resistance $r$, controlled by the relay K⁶. As soon as the current in the motor circuit decreases sufficiently after the motors have been connected in series to the switch C, the relay K⁶ closes its contacts and short-circuits the resistance $r$, and the circuit through the winding of the switches P', P², is as follows: from the positive conductor 31 through the conductor 47, the contacts of the relay K⁶, the conductor 54, the winding of the switches P', P², the conductor 55, and the contacts $n^2$ and $n'$ of the master controller to the negative conductor 32. The switches P', P² now close their contacts in the motor circuits, and open the contact $p'$ in the circuit of the winding of the switch C, causing the switch C to open and deënergize the windings of the relays K⁵ and K⁶. The resistance $r$ is thereby inserted in the winding of the switches P', P², but they do not open their contacts since sufficient current still flows to hold them closed. Upon the closure of the switches P', P², the motor circuit is as follows: from the positive conductor 31 through the motor A, the resistances R⁴ and R², the conductors 34 and 35, and the contacts of the switch P² to the negative conductor 32; and also from the positive conductor 31 through the conductor 30, the contacts of the switch P', the winding of the relay K', the resistances R³ and R', the motor B and the conductor 32 to the negative. The motors are now connected in parallel, the motor A having resistances R² and R⁴ in circuit, and the motor B having resistances R' and R³ in its circuit. The relay K' has its winding in the circuit of the motor B, and upon the reduction of current due to the speeding up of the motors, this relay will close its contacts, causing the closure of the switch 1, which short circuits the resistance R' and energizes the winding of the relay K². The relays K², K³, and K⁴ close in succession when the current in their respective windings is reduced to the value at which these relays are adjusted to operate and cause the successive closure of the switches 2, 3, and 4, thereby cutting out the resistances R², R³, and R⁴. This corresponds to step 11, as shown in Fig. 4. The resistances are now all removed from the motor circuits, and the two motors are connected in parallel directly to the source of supply, and will operate at their normal speeds. The operator can cause a reduction in the speed of the motors by moving his controller back to the position desired, thereupon causing the opening of the resistance controlling switches and the proper connection of the motors in series or in parallel, as he desires.

Fig. 4 is a key to the circuit connections shown in Fig. 3, and indicates which switches are closed at the corresponding steps or positions of the master controller. Step 6 is the full series position, at which time the switch C only is closed, and step 11 is the full multiple position, at which time the switches 1, 2, 3, 4, P', and P² are closed. The interlocking lever E is provided to prevent the simultaneous closure of the switches P', P², and the switch S, the arrangement being the same as in Fig. 1.

Referring to Fig. 3, if the operator chooses to do so, he can move his master controller quickly to position 11, or the full parallel position. In this case the switches will close in the proper sequence, first connecting the motors in series with each other and all of the resistances. The resistances will then be cut out in the order described, the closure of the switches being controlled by the current flowing in the motor circuit. The motors will then be connected in series, shunting all the resistances by means of the switch C, and this will be followed by the connection of the motors in parallel, the closure of the parallel switches being controlled by the current flowing in the motor circuit by means of the relay K⁶. When the motors are first connected in parallel, resistances are included in each motor circuit, and they are then automatically cut out in accordance with the current flowing in the motor circuit, the resistances in one motor circuit being controlled by the windings in the other motor circuit. So, also, in the arrangement shown in Fig. 1, the operator may move his master controller quickly from the off position to position 2, which is the full parallel position, and the switches will close in the proper order, first connecting the motors in series with each other and the starting resistances; then connecting the motors in series with each other, the starting resistance being shunted; and then connecting the motors in parallel with each other with resistances in each motor circuit, these resistances being finally cut out by the action of the resistance controlling switches. Each step in the process of cutting out the resistances and changing from series to parallel is controlled by the current in the motor circuit. In other words, after each step in the acceleration the motor current must decrease to a certain predetermined value before the next step can take place. Referring to Fig. 3, the same operation can be secured by placing the winding of the relay K' between the point X and the resistance R⁴ in the circuit of the motor A instead of in the position shown in the drawing. This will provide two relay windings in the circuit of the motor A, and two relay windings in the circuit of the motor B when the motors are connected in parallel, giving a slightly better balance of the resistances in the two circuits.

It is to be noticed that, when the motors are in parallel, the resistances connected in one motor circuit are controlled by windings in the other motor circuit, and vice versa. In Fig. 1, the windings of the resistance controlling switches themselves control the cutting out of the resistances, while in Fig. 3 the windings of the relays control the cutting out of the resistances.

I have not shown reversing switches for the motors, but if it is desired to reverse the motors, suitable devices for doing this can be supplied by any one skilled in the art.

I do not wish to be limited by the particular forms which I have shown of my invention, since it will be obvious to those skilled in the art that other arrangements can be made without departing from the spirit of my invention.

I claim—

1. In a series-parallel system of motor control, a pair of motors, resistance therefor, a switch for cutting out said resistance, a winding for controlling the closure of said switch, a switch for connecting the motors in series in a circuit including the said winding, a second switch for connecting the motors in series in a circuit shunting said winding, and a switch for connecting the motors in parallel including the said winding in the circuit of one of the motors.

2. In a series-parallel system of motor control, a pair of motors, a motor circuit, resistances for the circuit, sets of contacts for the resistances, a winding for controlling the closure of each set of contacts, means for connecting in the motor circuit the motors in series with each other and the said windings, and means for deënergizing the said windings and connecting the motors in series.

3. In a series-parallel system of motor control, a pair of motors, a motor circuit, resistances for the circuit, sets of contacts for the resistances, a winding for controlling the closure of each set of contacts, means for connecting in the motor circuit the motors in series with each other and the said windings, means for deënergizing the said windings and connecting the motors in series, and means for connecting the motors in parallel and re-inserting the said windings in the circuit of at least one of the motors.

4. In a series-parallel system of motor control, a pair of motors, a motor circuit, resistances for the circuit, sets of contacts for the resistances, a winding for controlling the closure of each set of contacts, means for connecting in the motor circuit the motors in series with each other and the said windings, means for deënergizing the said windings and connecting the motors in series, and a winding in the motor circuit controlling the operation of the said means.

5. In a series-parallel system of motor control, a pair of motors, a motor circuit, resistances for the circuit, sets of contacts for the resistances, a winding for controlling the closure of each set of contacts, means for connecting in the motor circuit the motors in series with each other and the said windings, means for deënergizing the said windings and connecting the motors in series, and means connecting the motors in parallel and re-inserting the said windings in the motor circuit, and a winding in the motor circuit controlling the operation of the last mentioned means.

6. In a series-parallel system of motor control, a pair of motors, a motor circuit, resistances for the circuit, individual windings for controlling the resistances, the said windings being adapted to be connected in the motor circuit in a predetermined order, means connecting the motors in series with each other and the resistances and windings, means for connecting the motors in series shunting the resistances and the windings, and means for connecting the motors in parallel and inserting the resistances and windings in the motor circuit.

7. In a series-parallel system of motor control, a pair of motors, a motor circuit, resistances for the circuit, windings for controlling the resistances, means connecting in the motor circuit the motors in series with each other and the resistances and the windings, means connecting the motors in series shunting the resistances and the windings, means for connecting the motors in parallel and including resistances in each motor circuit, and for reënergizing the said windings for controlling the resistances.

8. In combination, two sets of resistances, a circuit therefor, windings for controlling the resistances arranged to be connected in the circuit, means for connecting the resistances in series with each other and the said windings, means for shunting the resistances and the windings, and means for connecting the sets of resistances in parallel circuits and including some of the said windings in each parallel circuit.

9. In combination, two sets of resistances, a circuit therefor, windings for controlling the resistances arranged to be connected in the circuit, means for connecting the resistances in series with each other and the said windings, means for shunting the resistances and the windings, and means connecting the sets of resistances in parallel and for connecting the windings for each set of resistances in the circuit of the other set of resistances.

Signed at Cleveland, Ohio, this 13th day of December, A. D. 1912.

JAY H. HALL.

Witnesses:
RUTH H. BENNETT,
H. M. DIEMER.

Copies of this patent may be obtained for five cents each, by addressing the "Commissioner of Patents, Washington, D. C."